United States Patent [19]

Matsuda et al.

[11] Patent Number: 4,519,763
[45] Date of Patent: May 28, 1985

[54] APPARATUS FOR INJECTION COMPRESSION MOLDING

[75] Inventors: Shunsuke Matsuda, Osaka; Katsuaki Mitani, Kyoto; Hironori Yoda, Ueda; Kesaji Nishizawa, Nagano, all of Japan

[73] Assignees: Matsushita Electric Industrial Co., Ltd., Osaka; Nissei Plastic Industrial Co., Ltd., Nagano, both of Japan

[21] Appl. No.: 479,071

[22] Filed: Mar. 25, 1983

[30] Foreign Application Priority Data

| Mar. 29, 1982 [JP] | Japan | 57-51711 |
| Mar. 29, 1982 [JP] | Japan | 57-51715 |
| Mar. 29, 1982 [JP] | Japan | 57-51716 |
| Mar. 29, 1982 [JP] | Japan | 57-51719 |

[51] Int. Cl.$^3$ ............................................. B29F 1/00
[52] U.S. Cl. ........................... 425/192 R; 425/451.2; 425/451.9; 425/555
[58] Field of Search .................. 264/328.7, 328.16; 425/555, 192 R, 451.2, 451.9, 595

[56] References Cited

U.S. PATENT DOCUMENTS

| 2,781,547 | 2/1957 | Moxness | 425/555 |
| 2,938,232 | 5/1960 | Martin | 425/555 |

FOREIGN PATENT DOCUMENTS

| 55-77545 | 6/1980 | Japan . |
| 56-1351 | 1/1981 | Japan . |
| 57-95430 | 6/1982 | Japan . |
| 57-968336 | 6/1982 | Japan . |
| 57-968346 | 6/1982 | Japan . |
| 7614425 | 12/1976 | Netherlands . |

OTHER PUBLICATIONS

Engel Information, Engel KG Maschinenfabrik, Schwerterg Austria, Apr. 1975.

Primary Examiner—Donald E. Czaja
Assistant Examiner—V. Fischbach
Attorney, Agent, or Firm—Wenderoth, Lind & Ponack

[57] ABSTRACT

An injection compression molding apparatus has a mold unit having a stationary die plate and a movable die plate movable toward and away from the stationary die plate with mold plates therebetween defining a mold cavity into which an injection nozzle is directed, a supporting plate, a main cylinder supported on the supporting plate and a main cylinder ram having the outer end connected to the movable die plate for moving the movable die plate between a position in which the mold is fully closed and a position in which the mold is open to permit discharge of a molded product, and a compression stroke setting device for setting the position of the movable die plate at a position spaced a distance away from the fully closed position corresponding to a desired compression stroke of the mold. The device includes an adjustment part positioned either between the stationary die plate and the movable die plate or between the movable die plate and the supporting plate which is movable laterally of the direction of movement of the movable die plate for permitting the movable die plate to move to the fully closed position or permitting the movable die plate to move to the open position of the mold.

30 Claims, 65 Drawing Figures

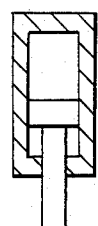
FIG. 22a.
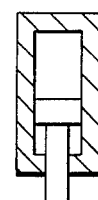
FIG. 22c.
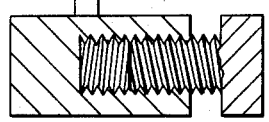
FIG. 22b.
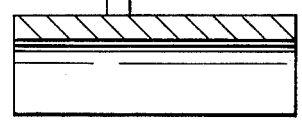
FIG. 22d.
FIG. 23a.
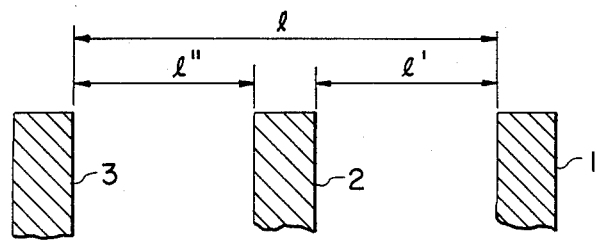
FIG. 23b.
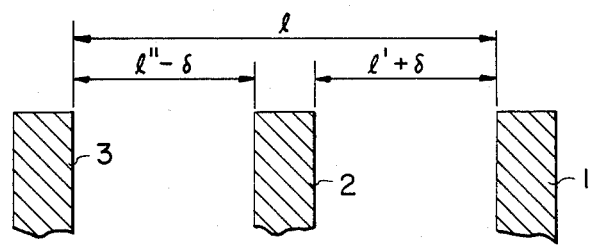
FIG. 23c.
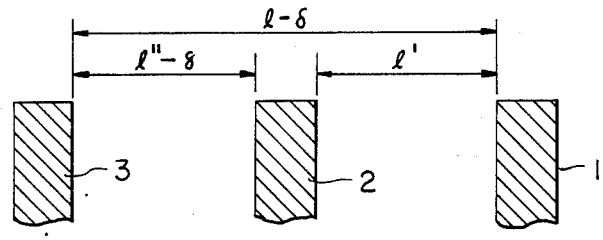

APPARATUS FOR INJECTION COMPRESSION MOLDING

BACKGROUND OF THE INVENTION

1. Field of the Invention

This invention relates to a method of injection compression molding and an apparatus for performing the same.

2. Description of the Prior Art

In injection molding, molten resin is injected into a cavity of a mold firmly held by the mold structure, an injection cylinder applies pressure through the resin in a spue or runner in an operation called applying the holding pressure until the resin at a narrow gate at the spue or runner cures to thereby prevent counter flow of the resin in the cavity, and after resin at the gate cures, the heat of resin in the cavity is removed through the mold to cool the resin, thus obtaining the molded resin product.

The density of the molten resin usually is smaller than that of the solid resin and the resin diminishes in volume as the resin cures, thereby causing shrinkage of the resin in the mold. For example, in a case where a product 100 mm in diameter and 10 mm thick has density of 1.17 in the molten state and 1.20 in the solid state, its volume becomes 76.57 cc when it reaches ambient temperature after the resin cures from the molten state where its volume is 78.54 cc, i.e. equal to that of the mold cavity. Assuming that the reduced volume is due only to shrinkage in the thickness direction, the finished product is 9.75 mm, which is less than the desired thickness by 0.25 mm.

As a countermeasure for overcoming mold shrinkage, a method has been studied which supplies an excess of resin to the mold until it slightly opens at the parting line. A method for controlling the amount of opening the mold (cited in Japanese Patent Laid-Open No. Sho-50-39851), and the Rolinx method of over filling ("new concept in injection molding, Rolinx process extended application of plastics" Plastics, 30, 330, April (1965)), have been proposed. Also, a method has been proposed which has a small hydraulic piston in a cylinder in the mold to cause a core to move into the mold cavity, or a piston-cylinder device is used for an ejector, so that resin is injected into an intentionally enlarged cavity and the hydraulic piston moves forwardly to reduce the size of the cavity, thereby producing a molded product of the predetermined thickness, this method being known as the Micro Molder method (H. Holt: "New technique in shrinkage control" SPE J. P519, June (1964)).

Needless to say, it is an elemental concept to design a larger cavity than that of the finished product in anticipation of the shrinkage, but for a product with a larger thickness or with different thicknesses, resin leaves the mold at the thick wall portion, which makes such a design impossible in practice. Hence, a trial and error method must be used.

The aforesaid over filling method is recognized as requiring a high injection pressure and also as having limited shrinkage compensation effect in a thin wall portion where less shrinkage occurs when the product has different thicknesses. In the Micro Molder Method, a cylinder ram advances following the shrinkage of the resin in the mold, so that while the surface of the product at the moving core side will be finished with accuracy, the opposite surface may be finished with insufficient accuracy.

In the light of the above, an injection compression molding method for obtaining compression of the resin by use of a mold clamping force has been proposed by ENGEL CO. (LUDWIG ENGEL KG MACHINEN FABRIK, A-4311 SCHWERTERG AUSTRIA). This method uses a toggle joint which is not fully extended during the injection process and which is extended to the full extent during the compression process, so that the toggle system mold clamping force acts as the compression pressure.

The compression by the use of the toggle joint is deficient in that there is no control of the compression pressure. The necessity of control for compression pressure will be explained by reference to the PVT curve of FIG. 1 showing the relationship of the pressure applied to the resin, the specific volume of the resin and the temperature of the resin. The abscissa is the temperature T of resin and the ordinate the specific volume V, and the relation between V and T for the resin is shown for a constant applied pressure.

Using the aforesaid injection compression molding apparatus, one can trace on this graph the steps of injecting resin into the cavity of the mold, compressing it, and ejecting it therefrom. The terminal point V-P of the injection stage is represented by A, and the pressure of the resin is increased along the path A-B due to injection pressure while the temperature of resin is falling. The temperature of resin continues to fall even after the injection pressure is discontinued, and since the volume decreases even without external pressure and has the specific volume under low pressure, the path B-C is traced. At time C compression is applied by fully extending the toggle, while taking backward flow into consideration, and the pressure in the resin increases before the temperature of the resin falls very much, i.e. along the path C-D. At this time, while the toggle is extended to the fullest, the temperature of resin falls and the pressure also falls slightly along the path D-E as the volume is reduced by curing and cooling, and this causes some movement of resin. However, this pressure is applied to the resin while the fluidity is deteriorating, thereby generating strain within the resin. Thereafter, upon opening the mold at a temperature at which ejection is desired, since the external pressure decreases, the resin pressure moves along the path E-F and the specific volume increases. Thereafter the pressure moves along the path F-G for normal cooling of resin under the atmospheric pressure, thus completing the molding.

In such a case, the shrinkage ratio during molding is obtainable from the difference between the specific volumes at the points E and G. The compression method using the toggle adjusts pressure by positioning a toggle arm with a fixed arm length, but because the pressure is different at different temperatures of the mold, the temperature of a tie-bar, and the temperature of the mechanism for positioning the toggle arm, it is difficult to keep the parts stationary. Therefore, it is difficult to control the compression pressure. Referring to the PVT curve, it is not clear whether the termination of the toggle arm movement gives a pressure at point D or D', thereby making accurate pressure control impossible.

On the other hand, the direct compression method using a hydraulic cylinder can precisely adjust maximum compression pressure. When the compression pressure, as shown in FIG. 2, is controlled to fall so that the specific volume of the resin remains constant as the temperature of the resin drops, i.e. moves along line D-E of FIG. 2, the resin is not deformed at all during the process of curing, thereby creating no strain, which shows that it is possible to carry out molding having a fixed mold shrinkage ratio. In this case, the difference in volume between the cavity and the resin coincides with the difference in specific volume between the points D and G, and it is possible to control the volume of the cavity so that it remains constant, thereby making possible molding with a constant shrinkage ratio from molding cycle to molding cycle.

SUMMARY OF THE INVENTION

This invention seeks to solve the above-described problem. An object of the invention is to provide a method of injection compression molding and an apparatus for performing the same which solves the problems of:

(1) how to enlarge the volume of the cavity and control the enlargement of volume, (2) how to smoothly open and close the mold for ejecting the products, and (3) how to obtain a compression process capable of controlling compression.

A direct compression system injection compression molding apparatus according to the invention is used to make it possible to achieve a molding method which cannot be achieved by the toggle system apparatus.

When molding a larger thickness product, the cooling speed in the interior of mold is substantially slower than that at the surface, so that the points D in FIGS. 1 and 2 actually extend to the low temperature portion on the 1400 kg/cm² pressure curve due to the temperature variation within resin.

Hence, the mold shrinkage will occur in a different ratio at each portion of the product which prevents much improvement in the accuracy of the product.

Therefore, for products having a large thickness and of different thicknesses or on which it is easy to cause a weld mark, when the temperature at the central portion where the temperature of the resin is the highest, as shown in FIG. 3, reaches the lower limit at which it is possible to compress and mold the resin, in other words, the temperature generally called the curing point (140° to 150° C. in acrylic resin), the surface portion is heated by high-frequency radiations, steam, hot water, or a heater, to make the temperature of resin in the mold cavity uniform, and then the compression molding is carried out, whereby the shrinkage rate throughout the resin is uniform during compression molding, thereby making possible the exact reproduction of the shape of the mold surface.

In this case, after completion of injection of the resin, compression is first preliminarily applied to the resin for a short time to prevent the occurrence of internal bubbles or the surface depressions which may follow the resin cooling, and then the pressure is immediately lower to allow for primary compression molding. Also, care is taken not to apply high pressure to the resin when there is a large temperature difference between the interior and the surface, thereby obtaining a homogeneous product.

The compression method, as shown in FIG. 3, of "light compression" → "decompression" → "compression molding", is difficult to put into practical use unless a hydraulic cylinder is used. Such method, however, has been put into practical use by various mold clamping mechanisms to be discussed below.

Thus, an object of the invention is to provide an injection compression molding method used together with multistage temperature control for the mold.

The above and other objects and features of the invention will be more apparent from the following description in connection with the accompanying drawings.

BRIEF DESCRIPTION OF THE DRAWINGS

FIGS. 22(a)-22(d) are sectional and end views of the key for changing of length of the rod;

FIGS. 23(a)-23(c) are diagrammatic views showing the distances between the three die plates during operation of the injection compression molding apparatus of the invention;

DESCRIPTION OF THE PREFERRED EMBODIMENT

In a development of this invention, in order to attain the aforesaid objects, a fine adjustment compression stroke setting mechanism is provided between a stationary side die plate and a movable side die plate, which fine-adjustment mechanism regulates the spacing between the plates during the mold clamping and the first part of the compression stroke, the regulation being ended after filling the mold cavity with molten resin so that the high pressure mold clamping will be carried out.

Figure 4A:
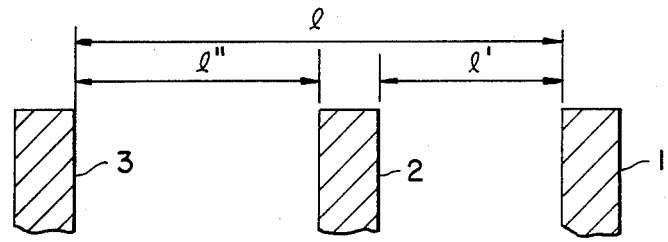
FIGS. 4(a)-4(c) are schematic diagrams showing the basic concept of the invention.
Figure 4B:
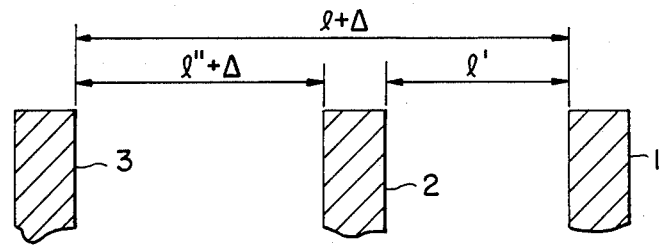
Figure 4C:
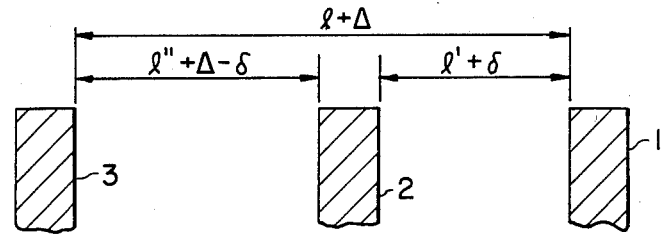

FIGS. 4(a)-4(c) show, in the various steps of operation of the injection compression apparatus of the invention, the distances between the die plates, the distance between a mold clamping cylinder mounting table or a tie bar-support plate fixed thereto and the movable die plate, and the tie bar length. An explanation will be given of the concept of the invention according to the above.

FIG. 4(a) shows the normal distances between the respective die plates with the mold closed during low pressure mold clamping, the tie bar length being given by l, and the distance l' being the distance between the stationary side die plate 1 and the movable die plate 2 and corresponding to the dimension of the mold in the direction of mold movement, the distance l'' being the distance between the die plate 2 and the tie bar support plate 3, the movable die plate being movable by movement of a cylinder ram.

FIG. 4(b) shows the positions of the parts in the high pressure mold clamping state in which the mold clamping cylinder ram is hydraulically driven and moved forward, and in which when the mold clamping closes the mold sufficiently, the distance l' hardly changes even during the high pressure mold clamping but the length of the tie bar is increased by $\Delta$ to $l+\Delta$, which extension causes a corresponding change in the distance l'' to $l''+\Delta$.

Figure 3:
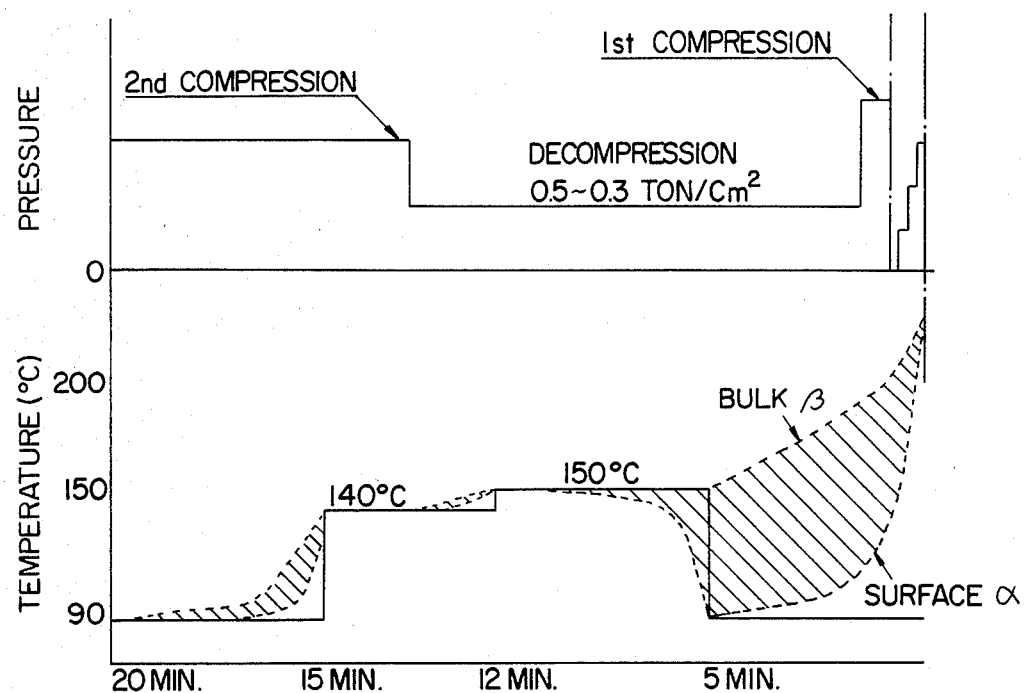
FIG. 3 is a graph of a compression program in combination with multistage temperature control for a mold.

A mechanism is incorporated in the injection compression molding apparatus of the invention which slightly opens the mold at the parting line between the molding plates so that during the high pressure mold clamping the dimension of mold in the direction of movement has added thereto a given compression stroke $\delta$ so as to become $l'+\delta$. In this case, as shown in FIG. 3 the distance between the movable die plate 2 and the tie bar support plate 3 becomes $l''+\Delta-\delta$.

In the part of the compression process which takes place after the injection, the force for holding the dimension of mold at $l'+\delta$ in the direction of mold movement is released, whereby the dimension becomes l', so that the compression is carried out only by the movement of movable plate 2 through a compression stroke $\delta$.

The mold clamping force $F_1$ during the injection and that $F_2$ during the compression are in the relation $$F_1 \leqq F_2.$$

When $F_1 < F_2$, the above distances change in each part of the operation as follows:

From the low pressure mold clamping to the injection step to the compression step, the respective distances change:

$$l \to l+\Delta \to l+\Delta$$

$$l' \to l'+\delta \to l'$$

$$l'' \to l''+\Delta-\delta \to l''+\Delta$$

If the mold clamping force $F_1$ is smaller than the resin pressure, the mold will open to produce a clearance in excess of the predetermined compression stroke. Therefore, the mold clamping force $F_1$ during the injection and the extent to which the mold is allowed to open as a result of the resin pressure during injection, i.e., the compression stroke $\delta$, should be obtained experimentally from a consideration of the form of the product, the temperature of the resin, and the injection pressure, etc. Hence, it is extremely important to provide a compression stroke setting mechanism which is easy to use to adjust the compression stroke $\delta$ with accuracy.

This invention provides a mechanism which is adapted to keep the dimension between the mold plates in the direction of movement of the mold plates at the distance $l'+\delta$ under a high pressure mold clamping pressure during the injection and filling of resin.

This invention is characterized in that the injection compression molding apparatus is provided with a mechanism capable of carrying out a compression operation after injection by use of high pressure mold clamping; opening the mold for discharging products and closing the mold for the subsequent work cycle, and setting the compression stroke in microns.

Figure 5:
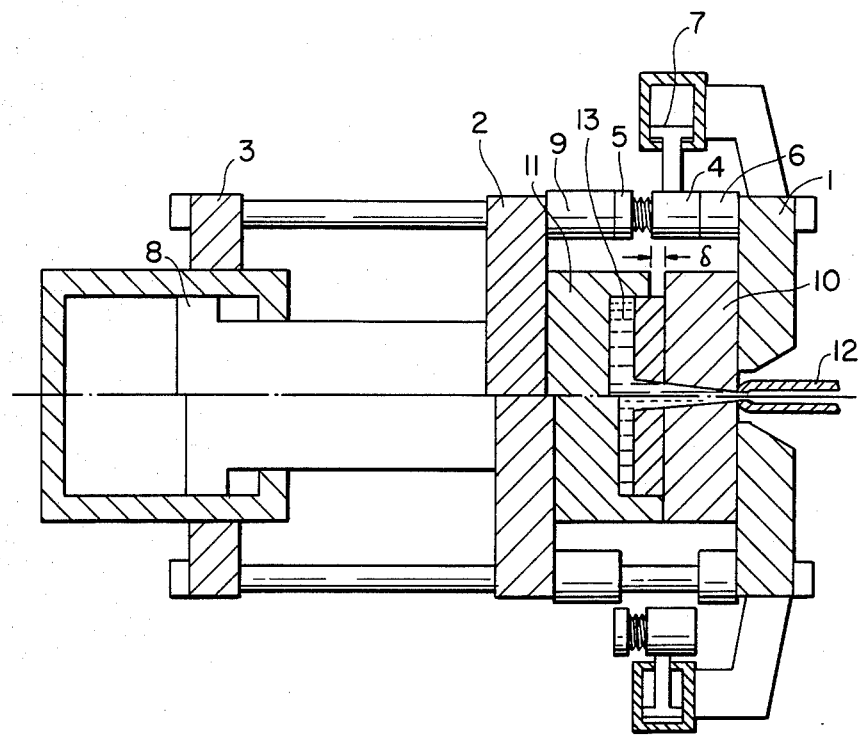
FIG. 5 is a sectional view of an embodiment of an injection compression molding apparatus of the invention, showing a fine-adjustment mechanism for adjusting the compression stroke, the upper half of the drawing showing a condition during the start of the compression stroke, and the lower half during the high compression condition.

An embodiment of the invention as shown in FIG. 5 will be described. A fine adjustment means is provided which is constituted by a compression stroke setting member 5 mounted on a fine-adjustment mechanism 4 capable of moving the member 5 to adjust the length of mechanism 4 to the desired length of the compression stroke $\delta$ with accuracy. An adjustment means positioning means is provided in the form of a cylinder 7 to position the fine adjustment mechanism 4 in the space between die plates to abut against a fine adjustment mechanism receiving portion 6 on the stationary die plate 1 and forming part of the adjustment means. A main cylinder 8 is used to carry out the low pressure mold clamping. The adjustment means further includes a fine adjustment mechanism receiving portion 9 provided on the movable die plate 2 and corresponding to the fine adjustment mechanism receiving portion 6 on the stationary die plate, abuts against the compression stroke adjusting member 5 during the compression stroke at the position of member 5 set by the fine adjustment mechanism 4, so that the predetermined necessary compression stroke δ set by the member 5 and mechanism 4 is provided between the opposed mold faces, i.e. the abutting faces on the stationary and movable die plates. Then, molten resin is injected from an injection nozzle 12 into the cavity 13 between piston 10 and cylinder 11 of the mold and fills the cavity. Next, while backward flow of resin is prevented by causing it to be set at the neck or by other methods, the cylinder 7 draws the member 5 and the fine adjustment mechanism 4 out from between the mold plates, and the main cylinder 8 carries out the high pressure mold clamping, moving plate 2 through the compression stroke δ, and the mold faces abut each other. The compression stroke δ is set by the pitch, diameter and the number of rotations of a screw rotated so as to move the compression stroke adjusting member 5 so as to give member 5 and adjustment mechanism 4 plus portions 6 and 9 a dimension $l' + δ$. Accordingly, the compression stroke can be set with accuracy. The compression stroke setting fine adjustment mechanism 4, which is positioned against the stationary die plate 1 by the cylinder 7, can alternatively be mounted on the movable die plate 2 or the body of molding machine, so long as it extends into the space between the mold plates. Also, the receiving portions 6 and 9 are not required when the fine adjustment mechanism 4 and member 5 are made equal in length to the mold plate spacing $l' + δ$, because the mechanism 4 and member 5 abut directly against the die plates 1 and 2.

Figure 6:
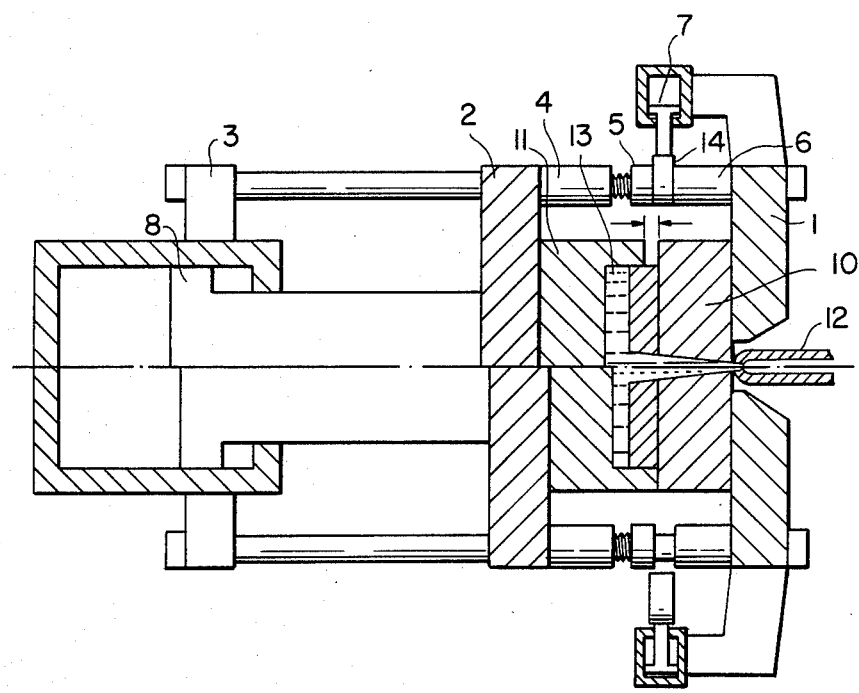
FIG. 6 is a view similar to FIG. 5 of a modified embodiment of the invention.
Figure 7A:
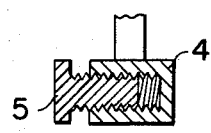
FIGS. 7(A)-7(D)(c) are longitudinal and transverse sectional views of examples of the compression stroke setting fine-adjustment mechanism used in the apparatus shown in FIGS. 5 or 6.
Figure 7A:
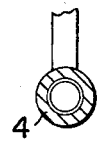
Figure 7A:
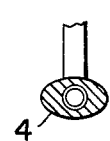
Figure 7B:
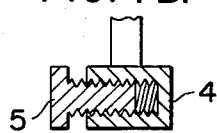
Figure 7B:
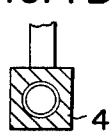
Figure 7B:
Figure 7C:
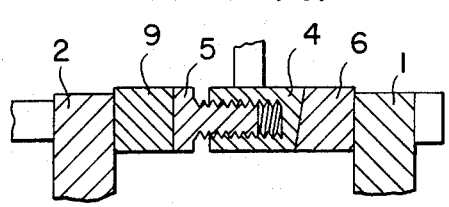
Figure 7C:
Figure 7C:
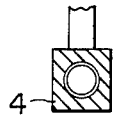
Figure 7C:
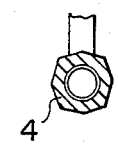
Figure 7D:
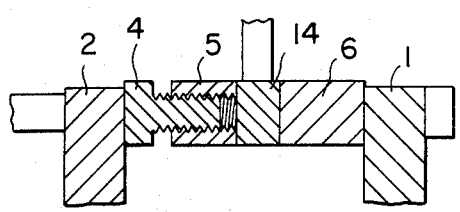
Figure 7D:
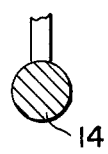
Figure 7D:
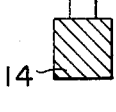
Figure 7D:
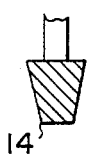

Referring to FIG. 6, a modified embodiment is shown, in which the compression stroke fine adjustment means has the adjustment mechanism and member 5 mounted to the stationary die plate or movable die plate, and a removable plate between the fine adjustment mechanism and the other die plate. In FIG. 6, the compression stroke δ is set by the pitch, diameter and number of rotations of the screw of the compression stroke adjusting member 5 of the fine adjustment mechanism 4 mounted on the movable die plate 2, and a removable plate 14 is mounted on the cylinder 7 which in its operative position has one side face abutting the receiving portion 6 and the other side face abutted the adjusting member 5, the parts 4, 5, 14 and 6 constituting the adjustment means having the dimension $l' +$ the compression stroke δ. Obviously the dimension of plate 14 in the direction of movement of the plates must be greater than δ. The cylinder 7 is actuated to withdraw the removable plate 14 so that the resin filled into the cavity 13 of mold can be compressed under high pressure by the main cylinder 3. In this case, the cylinder 7 can be mounted on the movable plate, or the fine adjustment mechanism 4 can alternatively be mounted on the fixed die plate 1. Also, the insertion plate 14 may be of any shape such as a flat plate, a rod or a wedge.

Referring to the parts of FIG. 7, several examples of various kinds of fine adjustment mechanism 4 and removable plates 14 are shown. FIG. 7(A) shows a cylindrical adjustment mechanism, in which can be round in cross-section as shown in FIG. 7(A)(a) or elliptical in cross-section as shown in FIG. 7(A)(b). FIG. 7(B) shows the mechanism with prism shape cross-section, such as square in cross-section as shown in FIG. 7(B)(a) or polygonal in cross-section as shown in FIG. 7(B)(b). FIG. 7(C) shows the same with a tapered end face, and which can have a round cross-section as shown in FIG. 7(C)(a), a square cross-section as shown in FIG. 7(C)(b) or a polygonal cross-section as shown in FIG. 7(C)(c). The receiving portion 6 has a correspondingly tapered face. FIG. 7(D) shows the removable plate 14 which can have a round end face as shown in FIG. 7(D)(a), a square end face as shown in FIG. 7(D)(b), or a trapezoidal face as shown in FIG. 7(D)(c).

Figure 8A:
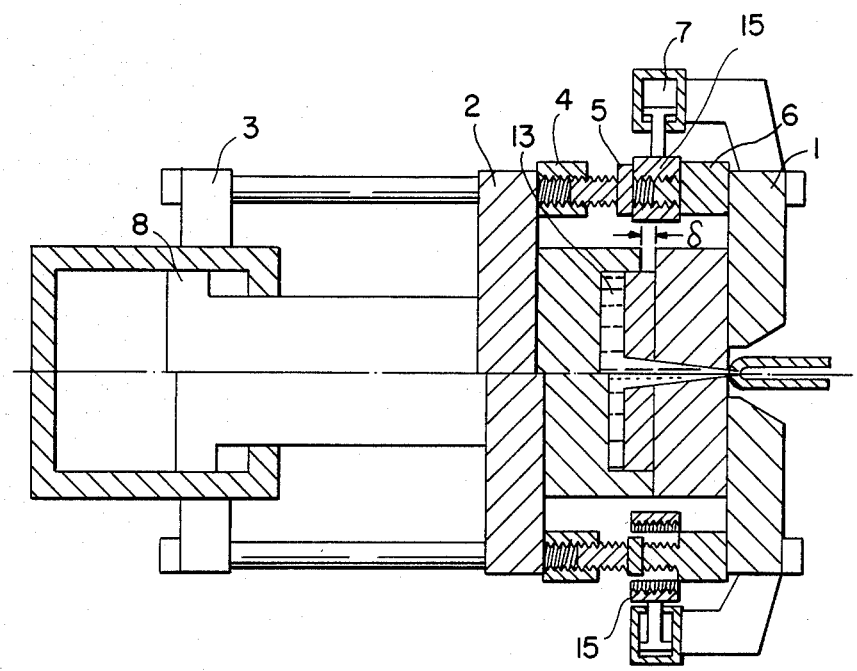
FIG. 8(A) is a view similar to FIG. 5 showing a modified form of the compression stroke setting fine-adjustment mechanism and FIG. 8(B) is a partial view of the mechanism of FIG. 8(A) in a different operating position.
Figure 8B:
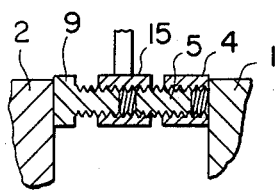

Referring to FIG. 8(A), the compression stroke adjusting member 5 and the fine adjustement mechanism 4 are mounted on the movable die plate 2, and a removable member in the form of a half nut 15 is removably positioned between member 5 and receiving portion 6 and tightened around a threaded part on portion 6 to define the distance $l' + δ$, and the adjusting member 5 abuts the end face of the half nut 15. The half nut 15 is released to permit member 5 to move freely toward fixed die plate 1 to permit the main cylinder 8 to carry out high pressure mold clamping to thereby compress the resin. FIG. 8(B) shows an alternative structure in which the threaded part of member 5 on the fixed die plate 1 is directly gripped by the half nut 15, and when released can move toward the portion 9 on the movable die plate 2.

Figure 9:
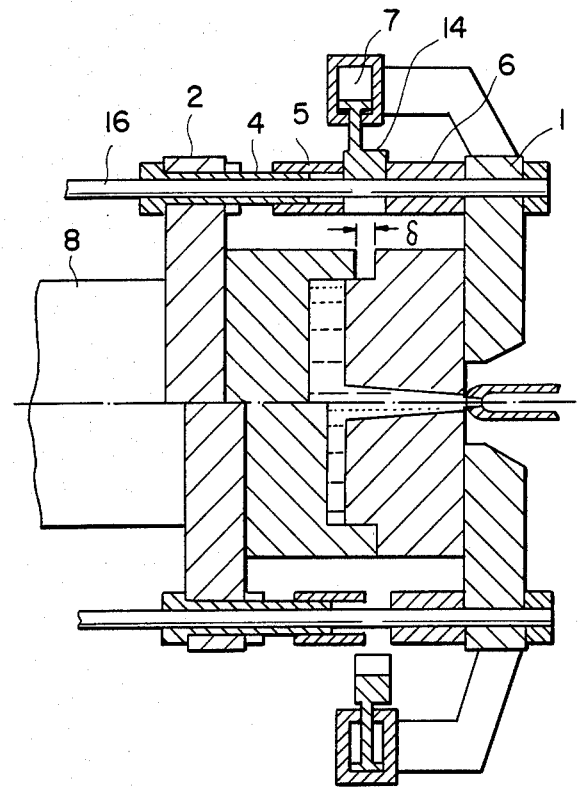
FIG. 9 is a view similar to FIG. 5 showing a further modified form of the fine-adjustment mechanism and FIGS. 9(a) and 9(b) are end views of different forms of the parts thereof.
Figure 9A:
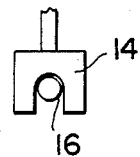
Figure 9B:
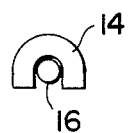

Referring to FIG. 9, the fine adjustment mechanism 4 and adjusting member 5 are hollow cylindrical members concentrically mounted on a tie bar 16, and the removable plate 14 has legs thereon to straddle the tie bar 16 and can have the shapes as shown in the end views of FIGS. 9(a) and 9(b). The two legs of plate 14 can be tapered on the inner surface to make them easy to position over the tie rod.

Figure 10A:
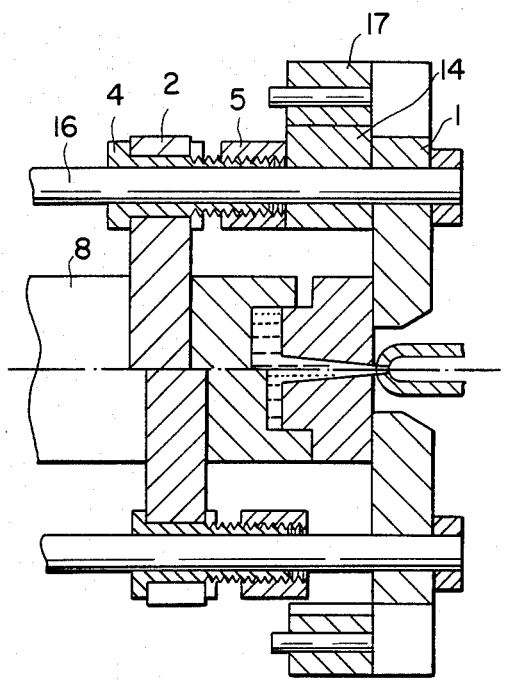
FIG. 10(A) is a view similar to FIG. 5 showing a further modified form of the fine-adjustment mechanism and FIGS. 10(B) and 10(C) are partial views thereof with parts of modified form, the FIGS. 10(A)(a), 10(A)(b), 10(B)(a), 10(B)(b) and 10(C)(a) being sectional and end views of parts thereof.
Figure 10A:
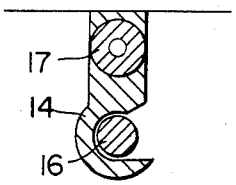
Figure 10A:
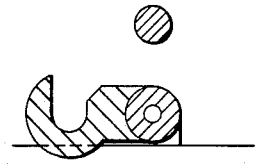
Figure 10B:
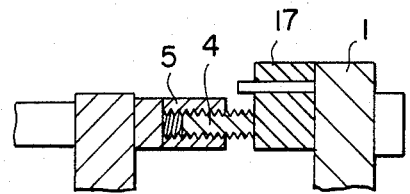
Figure 10B:
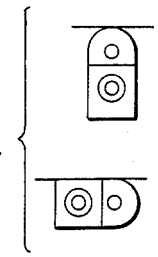
Figure 10B:
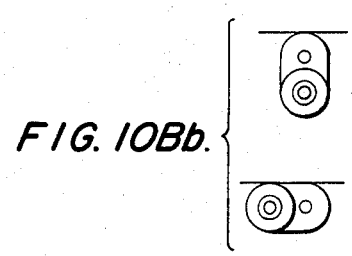
Figure 10C:
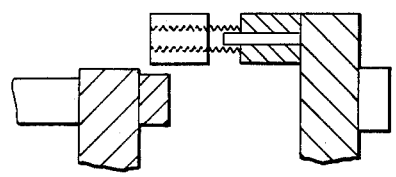

Referring to FIG. 10(A), a rotary fine adjustment mechanism 4 is provided around the tie bar with the member 5 extending into the space between the plates 1 and 2, and the removable member 14 is in the form of a hook which hooks around the tie bar 16 between member 5 and fixed plate 1 as shown in FIG. 10(A)(a). Member 14 is mounted on the shaft of a motor 17 for being pivoted to the position of FIG. 10(A)(b) when filling is completed and the high pressure compression is to begin. Alternatively, as shown in FIG. 10(B) the adjustment mechanism 4 and member 5 can be mounted on an arm attached to the shaft of motor 17 and pivoted out from between the plates 1 and 2 from the position of FIG. 10(B) to the position of FIG. 10(C). The member 5 can be square or round as shown in FIGS. 10(B)(a) and 10(B)(b).

Thus, the invention provides a compression stroke setting fine adjustment mechanism 4 in the space between the die plates so as to control the size of this space and set the length of the compression stroke with accuracy, whereby a resin product of optional thickness can be molded accurately in the desired size and free from burrs and voids. The means setting the initial size of the space is removed to make it possible to carry out the high pressure mold clamping without hindrance.

Another way to attain the aforesaid object according to the invention is to provide between the tie bar support plate or stand and the movable die plate setting rods for setting the length of the compression stroke, and to provide a key which abuts the setting rods and completes the means for setting the distance between the movable die plate and the tie bar support plate. After completion of injection of resin, the high pressure mold clamping means carries out the compression of resin, and thereafter the key, is removed from the rods to enable the mold to be opened.

Figure 11A:
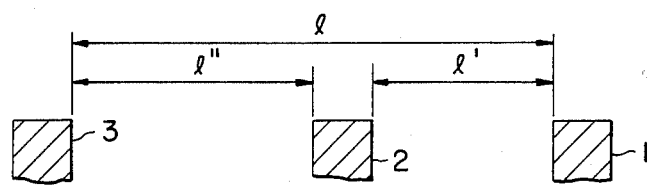
FIGS 11(a)-11(c) are diagrammatic views showing a further concept of the invention.
Figure 11B:
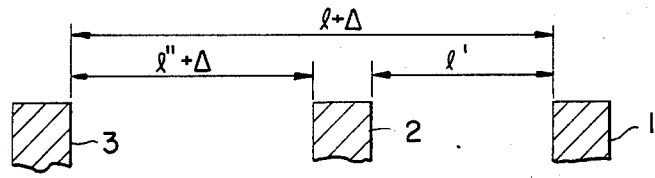
Figure 11C:
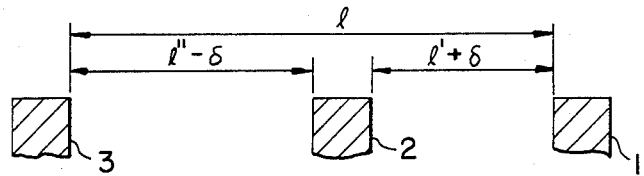

FIGS. 11(a)-11(c) show, in the various steps of operation of the injection compression molding apparatus of the invention, the distances between the die plates, the distance between the tie bar support plate and the movable die plate, and the length of the tie bar. An explanation will be given of the concept of the invention according to the above.

FIG. 11(a) shows the distance between the respective die plates with the mold closed during the low pressure mold clamping, the tie bar length being shown by l and the distance l' being the distance between the stationary die plate 1 and movable die plate 2. The distance l" is the distance between the movable die plate 2 and the tie bar support plate 3 or tie bar stand, and is variable depending on the movement of die plate 2 by the mold clamping cylinder ram 8. FIG. 11(b) shows the distances during high pressure mold clamping in which the mold clamping cylinder ram 8 moves movable die plate 2 a distance Δ from the above condition.

When the low pressure mold clamping pressure is sufficent to close the mold, the distance l' hardly changes, even during the high pressure mold clamping, but the length of the tie bar increases by Δ to be l+Δ, so that the distance between the die plate 2 and the tie bar support plate 3 becomes l"+Δ.

In the injection compression molding apparatus of the invention, high pressure mold clamping is not carried out during injection so that the mold, as shown in FIG. 11(c) opens slightly at the parting line due to the injection pressure and the dimension of mold in the direction of movement becomes l'+δ. Accordingly, this causes a change in l" to cause the tie bar support plate 3 to be spaced a distance l"−δ from the die plate 2. Subsequently, the high pressure mold clamping is carried out after completion of injection, the dimension of mold changing from l'+δ to l', thus carrying out a compression stroke of only δ.

If there is an increase of injection pressure in the injection process, the molding apparatus with dimension l"−δ has the tie bar length increased slightly to l+Δ', whereby the dimension of mold becomes l'+δ+Δ'. When the mold is closed to the dimension l', the actual compression stroke is:

$$\delta + \Delta'$$

Δ' is about 0.3 mm or less in a molding apparatus having a mold clamping force of 150 t.

The compression stroke δ by which the mold is opened for injection is obtainable experimentally depending on the form of the product, the temperature of the resin, injection pressure and the like.

This invention provides a mechanism which can set the aforesaid distance l"−δ and prevent it from becoming smaller, even when the injection pressure changes during the injection and filling, which can carry out the compression operation after injection by use of high pressure clamping, and also open the mold for ejecting the products, and set the compression stroke with accuracy in units of microns. This mechanism is provided between the movable die plate 2 and the tie bar support plate 3.

Figure 12:
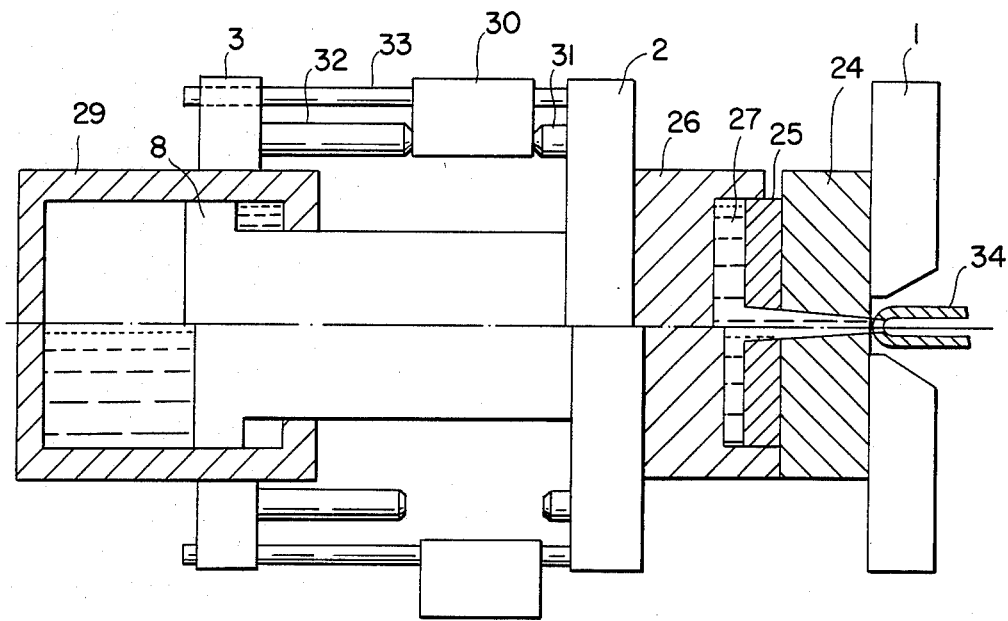
FIG. 12 is a view similar to FIG. 5 of a still further modified form of the compression stroke setting mechanism of the invention.

An embodiment of a compression stroke setting mechanism of the invention is schematically shown in FIG. 12, in which the mold is interposed between the stationary die plate 1 and the movable die plate 2, a cavity 27 being defined between a mold plate 25 on a mounting plate 24 on the stationary die plate 1, and a mold plate 26 on the movable die plate 2, the mold plate 26 having a complex structure including an ejector mechanism, which is omitted for simplification. A mold clamping cylinder 29 having a mold clamping ram 8 is mounted on the mold and the compression stroke setting mechanism is provided between the tie bar supporting plate 3 and the movable die plate 2.

In FIG. 12, a removable key 30 is interposed between stroke setting rods 31 and 32 on plates 2 and 3 and the cylinder ram 8 is retracted to move the mood to the resin-injection position as shown in the upper half of FIG. 12, namely the condition shown in FIG. 11(c). After completion of injection, the compression operation by high pressure clamping is carried out, during which the movable die plate is moved through the compression stroke, as shown in the lower half of FIG. 12. The key 30, having transmitted the injection pressure to the mold, is removed from between the rods 31 and 32, whereby the mold is ready for opening for the subsequent ejection of the product. Alternatively, the rod 31 may be omitted if the fixing of key 30 to the mounting rod 33 is rigid enough to oppose the force tending to open the mold by virtue of the pressure of resin in the mold caused by the injection pressure.

Figure 13A:
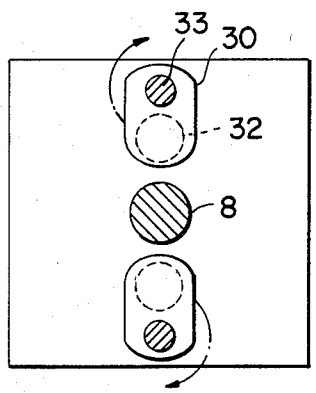
FIGS. 13(a)-13(c) are elevation views of a compression stroke setting rod and a key mounting lever in different positions.
Figure 13B:
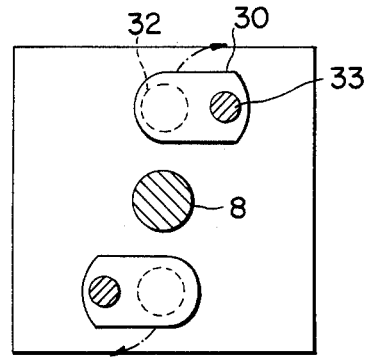
Figure 13C:
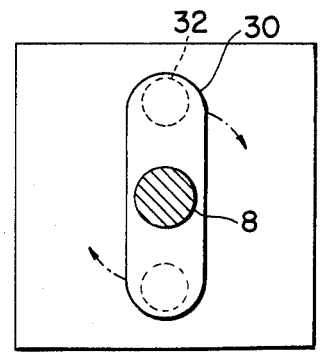
Figure 14A:
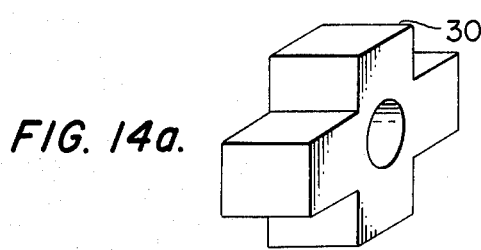
FIGS. 14(a)-14(e) are views of various forms of compression stroke setting rods and keys.
Figure 14B:
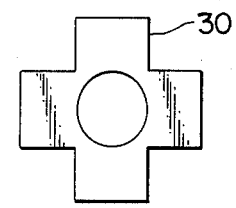
Figure 14C:
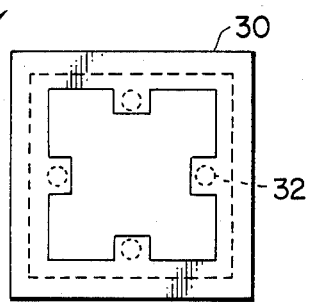
Figure 14D:
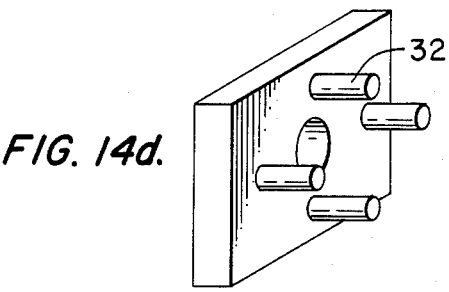
Figure 14E:
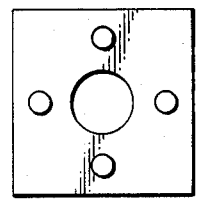
Figure 15:
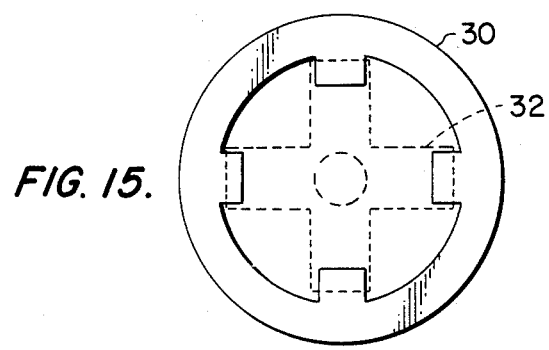
FIG. 15 is an end view of a rotary type key.

FIGS. 13(a) and 13(b) are end views of two types of keys 30, compression stroke setting rods 32 and mounting rods 33, the rods 32 and 33 being disposed in line with ram 8 in FIG. 13(a) and rods 33 being spaced laterally of rod 32 in FIG. 13(b). FIG. 13(c) shows one key 30 rotatably mounted on the cylinder ram 8. The number of compression stroke setting rods 32 is not limited to two, but may be more. Alternatively, the key can be an integral block rotatably mounted on ram 8 as shown in FIGS. 14(a) and 14(b). FIGS. 14(d) and 14(e) are views of other examples of the compression stroke setting rod means. A block has four rods spaced around the axis of cylinder ram 8 which have a dimension in the direction parallel to the axis of ram 8 longer than the mold opening and closing stroke. The key 30 has inwardly extending projections aligned with the legs, as shown in FIG. 14(c) and FIG. 15 and the key 30 rotates to move the projections out of the path of the legs on the setting block 32. A key which moves vertically, laterally or in any direction, can be used.

The rods 32 in FIGS. 14(d) and 14(e) and 12 are identical in form with each other and the length is not adjustable. They have a fixed length and are mounted on the fixed plate 3, thereby setting the compression stroke accurately. In this case, the key in FIG. 14(a) can be used.

Figure 16A:
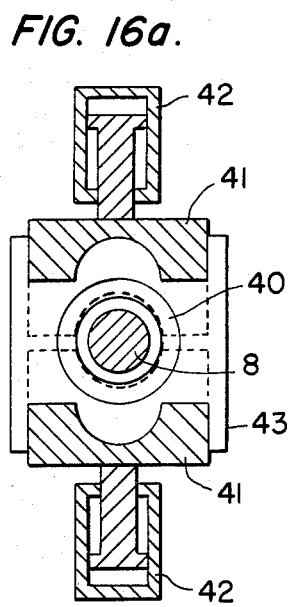
FIGS. 16(a) and 16(b) are a transverse and longitudinal section of a slide type key.
Figure 16B:
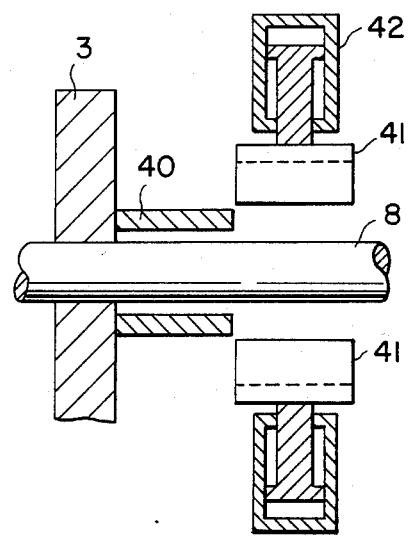

The keys 30 shown in FIGS. 13, 14 and 15 are rotary type keys. Alternatively, sliding keys driven by an air cylinder or hydraulic cylinder can be used, an example of which is shown in FIGS. 16(a) and 16(b), in which an annular setting member 40, corresponding to the compression stroke setting rods 32, is provided around the mold clamping cylinder ram 8, and keys 41 slideable radially of ram 8 along guides 43 are driven by a hydraulic cylinders 42 so as to be inserted around and removed from the ram 8 between member 40 and movable plate 2, as shown by the broken lines in FIG. 16(a). When the keys 41 are removed in the radially outward position, as shown in full lines, the mold can be opened. The hydraulic cylinders 42 are fixed to the tie bar support plate 3, movable die plate 2 at the movable side, or the tie bars, and the tie bar may of course be used as the guide for plate 2.

As seen from the foregoing, a mechanism has been provided in which the compression stroke of predetermined length is set during the injection, and thereafter the mold can be opened for discharging the product.

For accommodating a change in the length of the compression stroke δ, two method are available: (i) directly changing the length of the compression stroke setting rods, and (ii) of changing the mounting position of the rod. The method (i) permits adjusting the length in units of microns by mounting a micrometer head on the end of each rod. The micrometer head can be used to adjust the length of each rod so that they are all equal. The micrometer head can be replaced by a precision screw. However, in order to set the length in unit of microns, unless the diameter of the threaded part is large or a proper angle indexing mechanism is provided, it is difficult to balance the lengths of several rods well.

Figure 17A:
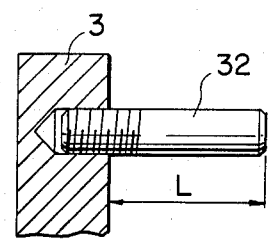
FIGS. 17(a) and 17(b) are sectional view examples of stroke setting adjusting rods.

The method (ii) adjusts the rod mounting position. For example, the threaded portion of compression stroke setting rod 32, as shown in FIG. 17(a), is threaded further into plate 3 to change the rod length L.

Figure 17B:
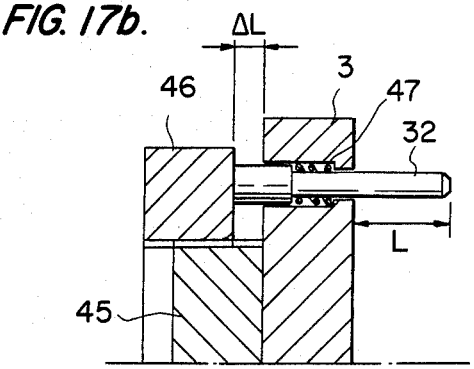

FIG. 17(b) shows a different means to accomplish this end. A position adjusting base 45 having the outer periphery threaded is mounted on the tie bar support plate 3 and a position adjusting plate 46 having a threaded inner periphery is threaded thereon. Rods 32 extend slidably through plate 3 and are attached to base 45. A change in the length of rod projecting from plate 3 towards plate 2 corresponds to a change in the size of the gap between the tie bar support plate 3 and the position adjusting plate 46, i.e. ΔL, whereby the effective rod length becomes L. By this means, the compression stroke setting rods 32 can all be positioned so as to have the same predetermined length L. The rods are all urged against the position adjusting plates 46 by respective mounting springs 47 in bores in the plate 3. Because adjusting base 45 has a large diameter, the adjustment of length L can be made accurately. For example, with a base 400 mm in diameter and a screw thread with a 3 mm pitch makes possible forward and backward movement of 24 μm per 10 mm of distance around the outer periphery, so that the change of length is very easy to control.

Figure 18:
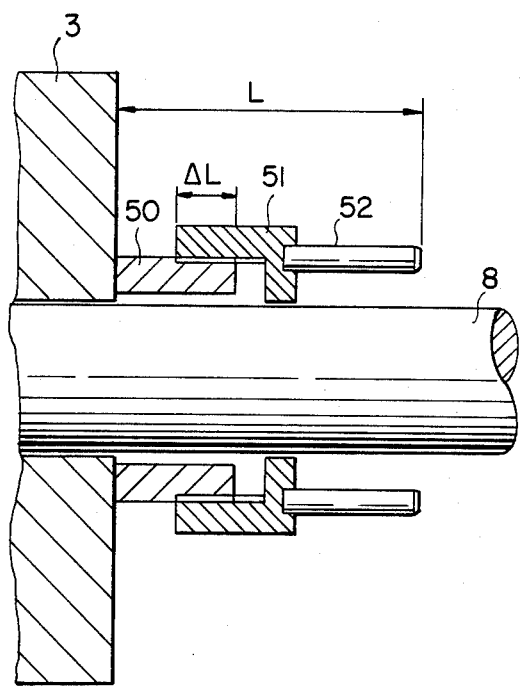
FIG. 18 is a sectional view of the use of the stroke setting structure of FIGS. 14(d) and 14(e)

FIG. 18 shows a further means for changing the rod length of the rod means shown in FIGS. 14(d) and 14(e). Rods 52 are mounted on an adjusting threaded plate 51, the adjusting threaded plate 51 being threadedly mounted on a rod length adjusting base 50 so that the length of each compression stroke setting rod 52 corresponds to the length of the assembly of base 50, plate 51 and rods 52. The length L can be varied by ΔL of threading the plate 51 along the base 50. Since various dimensions of molds are used, ΔL is determined by the fold having the maximum dimension and the mold having the minimum dimension.

ΔL is equal strictly to

"Maximum dimension of mold in the direction of movement minus the minimum dimension of the same plus the compression stroke δ", but is given approximately by "maximum dimension of mold in the direction of movement minus the minimum dimension of the same".

The length of the aforesaid rod is fixed and a micrometer head is mounted on the rod, or the aforesaid larger diameter screw thread is used, thereby adjusting the key length.

As seen from the above, the injection compression molding apparatus of the invention uses a mechanism which, during the injection, sets the compression stroke by setting the distance between the tie bar support plate or base and the movable die plate constant, so that the size of the cavity in the mold can increase in the thickness direction to increase the volume thereof during injection of the resin, and after the resin completely fills the cavity, the mold clamping force can be used to carry out compression and the mold can be opened for ejecting the product. Hence, the resin is not at all deformed during the process of resin curing and products free from strain are obtainable.

Still another means according to the invention in order to attain the aforesaid object is to provide a hydraulic cylinder having a long stroke and small force to open and close the mold, and to provide a compression hydraulic cylinder having short stroke and great force and of which the tie bar functions as a cylinder ram or piston on the stationary die plate fixed to the bed for the molding apparatus. An adjusting mechanism or adjusting rod is provided between a movable tie bar mounting plate or base thereof for positioning the tie bar and the movable die plate, and a key is provided which is insertable between the adjusting mechanism or adjusting rod and the movable die plate or mounting plate to thereby mechanically fix the distance between the tie bar mounting plate and the movable die plate. After completion of injection of the resin, the high force cylinder on the tie bar is supplied with hydraulic fluid to pull the tie bar toward the mold, the tie bar mounting plate or base is pulled to move the movable plate for carrying out the compression stroke, and the high force cylinder, after the completion of molding, is supplied on the opposite side with hydraulic fluid to move the tie bar away from the mold, and then the mold operating cylinder is moved away from the mold and simultaneously or sequentially the key is removed to permit the mold to open freely.

Figure 19A:
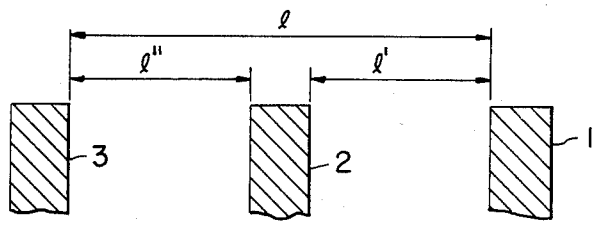
FIG. 19(a)-19(c) are diagrammatic views showing the relation of distances between the three plates during operation of the injection compression molding apparatus of the invention.
Figure 19B:
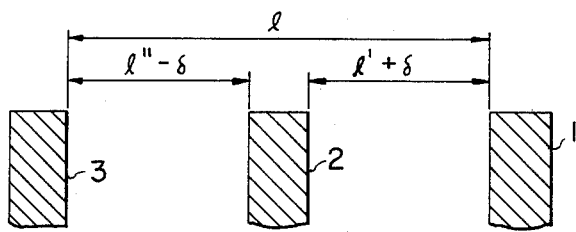
Figure 19C:
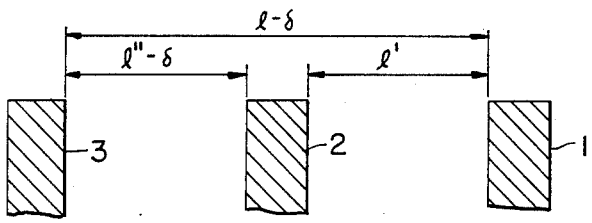

FIGS. 19(a)–19(c) show the correlation of the distance between the die plates, the distance between the tie bar support plate and the movable die plate, and the length of the tie bar during the various operating steps of this embodiment of the compression molding apparatus of the invention. An explanation will be given of the concept of this embodiment of the invention.

FIG. 19(a) shows the distance between the respective die plates during mold clamping under low pressure, the tie bar length being designated by l. The distance l' between the stationary die plate 1 and the movable die plate 2 corresponds to the dimension of mold in the direction of movement of the movable die plate. The distance l" between the movable die plate 2 and the tie bar support plate varies during movement of die plate 2 by the cylinder ram. Between the die plate 2 and the mounting plate 3 is provided a mechanism capable of precisely setting the distance l'. During injection of resin, the mold is slightly opened at the parting line or between the mold parts so that the dimension l' increases to l'+δ, and the cylinder ram is moved backwardly during the injection of resin into the mold through the compression stroke δ and stops at the rearward position as shown in FIG. 19(b).

By limiting the amount of change of $l''$ to $l''-\delta$, the setting of the compression stroke $\delta$ is possible.

This embodiment of the invention provides means to maintain $l''-\delta$ and $l$ even when the plate 2 is subjected to the injection pressure during the injection. In addition, during the injection, the injection pressure will slightly further increase the volume of cavity to thereby slightly increase $l$, which also reduces $l''-\delta$ slightly, but this change is neglected herein.

The compression cylinder for carrying out the high pressure compression process after completion of injection is provided on the stationary die plate 1 and the tie bar support plate is made movable, and the end of the tie bar is used as the cylinder ram thereof. The cylinder is supplied with high-pressure oil to retract the cylinder ram, and thus the tie bar so as to cause the tie bar support plate 3 to slide on the bed, whereby the tie bar support plate 3 is pulled toward the stationary die plate 1, and $l$ becomes shorter by the amount of the compression stroke, i.e. $l-\delta$ and the space between the die plates becomes $l'$ as shown in FIG. 19(c) to thereby subject the resin in the mold to the high pressure.

The embodiment of the invention provides a mechanism which sets the distance $l''-\delta$ between the movable die plate 2 and the tie bar support plate 3, the mechanism being capable of performing the high pressure compression operation after completion of the injection step by use of a hydraulic cylinder which uses as the cylinder ram the tie bar itself provided on the tie bar support plate 3. The mechanism is also capable of opening the mold for ejecting the products and closing it for a subsequent work cycle, and setting the compression stroke in units of microns.

Such an embodiment will be described in connection with FIG. 20, in which the compression stroke setting mechanism of the invention is disclosed. The mold is placed between the die plate 1 fixed to the bed and the movable die plate 2 so that a mounting plate 64 and mold plate 65 on the stationary plate 1 and the mold plate 66 on the movable plate 2 define a cavity 67, the movable mold plate 66 having a complex construction because an ejector mechanism (not shown) is incorporated thereon. Nozzle 75 injects resin into the mold cavity. A mold opening and closing cylinder 69 is mounted on die bar support plate 3, and a compression stroke setting mechanism is provided between the tie bar support plate 3 and the movable die plate 2.

A key 70 is removably inserted between the movable die plate 2 and compression stroke setting mechanism 71 and 72 mounted on the cylinder mounted in turn on the tie bar support plate 3. The cylinder ram 8 retracts during the injection of resin into the mold as shown in the upper half of FIG. 20, the positions of the parts corresponding to FIG. 19(b). The lower half of FIG. 20, a compression hydraulic cylinder 74, the piston or ram of which is constituted by one end of tie bar 73, is supplied with high pressure oil on the front side of the piston, whereby the tie bar support plate 3 is pulled toward the fixed die plate 1 to reduce the mold gap between die plates 1 and 2 is reduced to close the mold to coincide with the predetermined thickness of the product.

Figure 1:
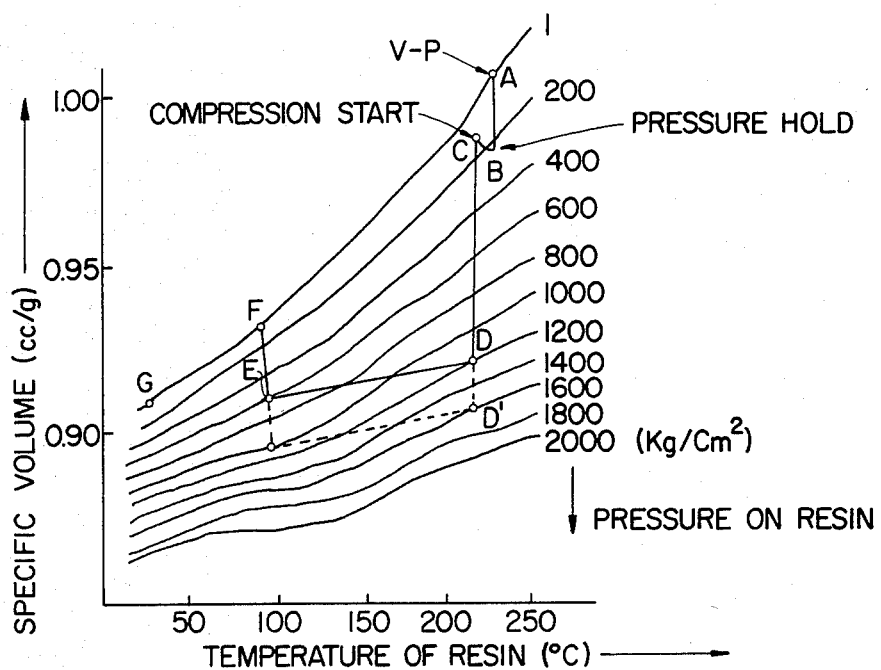
FIG. 1 is a graph of PVT curves showing the relation of the pressure applied to the resin, the specific volume thereof, and the temperature of resin when a toggle system molding apparatus is used.
Figure 2:
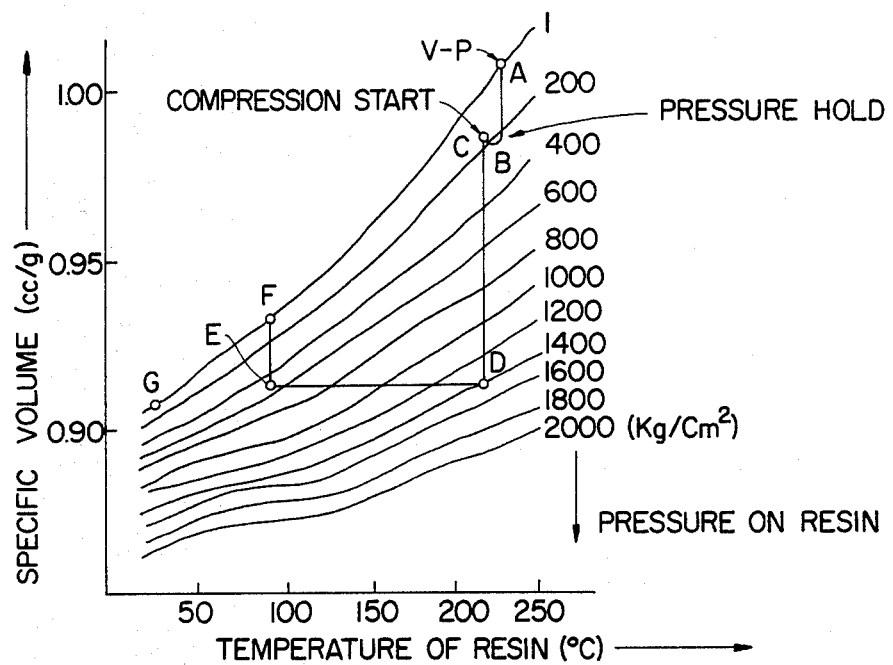
FIG. 2 is a graph of PVT curves showing the same relation for a molding apparatus with a direct compression system molding apparatus.

The compression pressure falls as the resin cools down, and upon completion of the compression, the hydraulic oil is fed into the cylinder 74 on the rear side of the piston to push the tie bar to the left in FIG. 2, whereby the key 70 is freed and can be removed. This condition is shown in the upper part of FIG. 21. Then the mold is opened by retraction of ram 8 for discharge of product as shown in the lower part of FIG. 20. Upon completion of the ejection of the product, the mold operating cylinder ram 8 is advanced and the key 70 is again inserted, and the cylinder ram 8 is retracted, thereby returning the mold to a condition for injection of resin, i.e. with the movable die plate retracted from the fixed die plate by $l'+\delta$.

Figure 20:
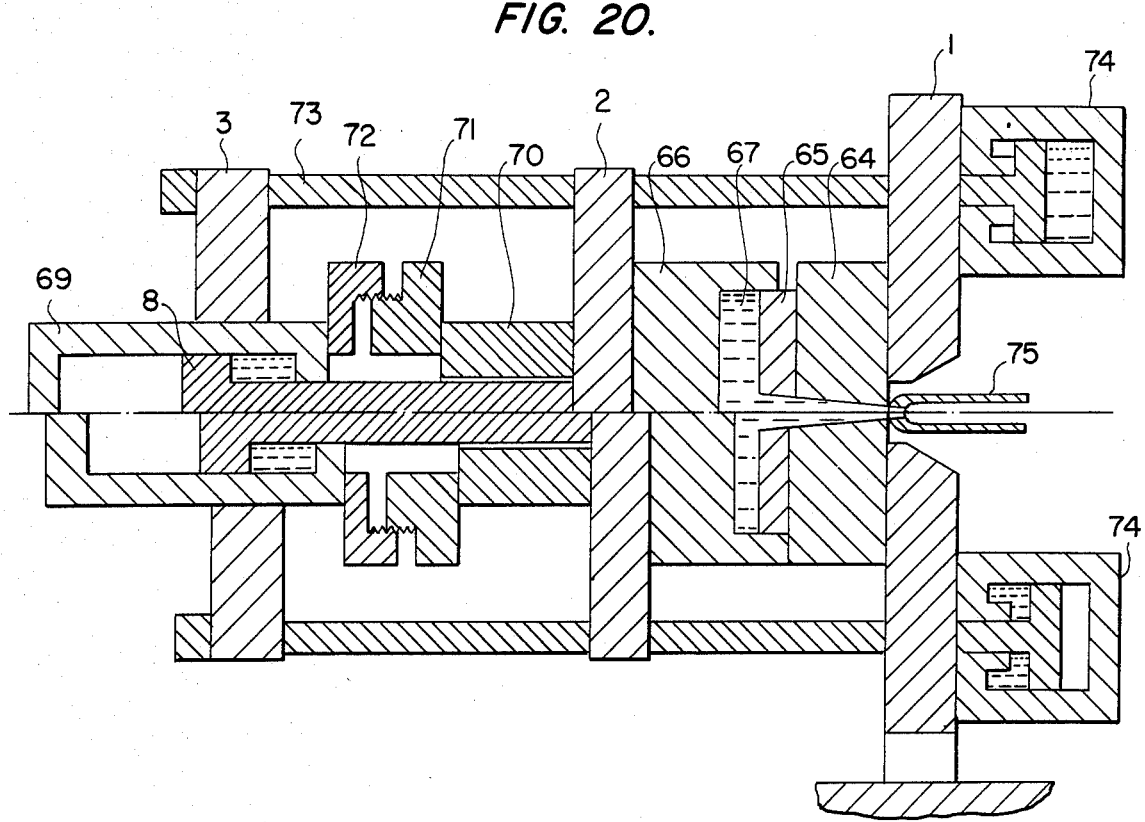
FIG. 20 is a view similar to FIG. 5 of another embodiment of the compression stroke setting mechanism of the invention.
Figure 21:
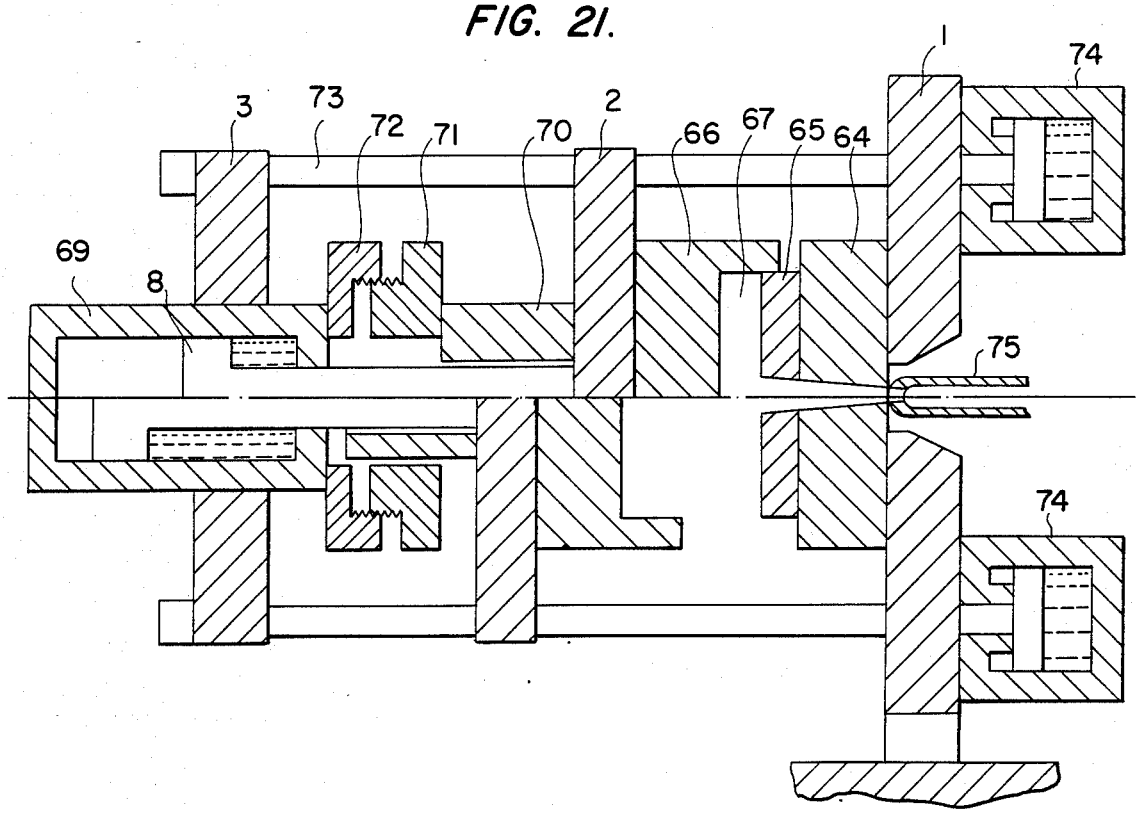
FIG. 21 is a view similar to FIG. 20 showing in the upper part the positions of the components during the injection in the lower part the positions of the components during the opening of mold for ejection.

The adjustement mechanism 71 and 72 and key 70, which are arranged around the cylinder ram 8 as shown in FIGS. 20 and 21, may alternatively be arranged around the tie bar, or in the space between the tie bar and ram. Also, the adjustment mechanism 71 and 72 may be mounted on the movable die plate 2. Such mechanism can use the structures of FIGS. 13 through 18. The key 30 and compression stroke setting rods 31 and 32 in FIG. 13 correspond to the key 70 and adjustment mechanisms 71 and 72 in FIGS. 20 and 21 respectively.

In the embodiment of the parts of FIG. 14 or FIG. 15, the key 30 corresponds to the key 70 in FIGS. 20 and 21 and the setting rod 32 to the adjusting mechanism 71, 72. Also, all the adjustment mechanisms in FIGS. 16, 17 and 18 can be used in the FIG. 20 and FIG. 21 construction. In addition, the length of the key can be changed as shown in FIG. 8. The key can have the form as shown in FIGS. 22(a) and 22(b) which are substantially the same as the adjusting means of FIGS. 7(A) and 9(b), respectively.

As seen from the above, the injection compression molding apparatus of the invention uses a mechanism keeping a constant distance between the tie bar support plate or base and the movable die plate for setting the compression stroke during the injection step while, the volume of cavity in the mold is enlarged. After completion of injection of resin, the compression is carried out by means of the mold clamping force, and the mold can then be freely opened for ejection of product. Hence, during setting the resin, is not deformed and products free from strain can be obtained.

A further aspect of the invention is to provide an injection compression molding apparatus which has a hydraulic cylinder having a long stroke and a small force to open and close the mold, and a compression hydraulic cylinder having a short stroke and large force, both mounted on a movable tie bar support plate or base, one end of tie bar functions as a cylinder ram or piston for the short stroke cylinder and the other end being fixed to the stationary die plate. An adjusting rod or adjustment mechanism is mounted on the tie bar support plate or base, or on the movable die plate, and a key is interposed between the adjusting rod or mechanism and the movable die plate or support plate for maintaining the compression stroke during the injection of resin into the mold by mechanically fixing the distance between the tie bar support plate and the movable die plate. After completion of injection of resin into the mold, the high force hydraulic cylinder is supplied with hydraulic oil to advance the tie bar mounting plate together with the support plate toward the stationary die plate, thereby reducing the effective length of the tie bar and the space between the die plates for carrying out the compression process. After completion of compression, the high force cylinder is operated to increase the effective length of the tie bar and the mold opening and closing cylinder is advanced to open the mold and simultaneously the key is removed.

FIGS. 23(a)–23(c) show the correlation of the distance between the die plates, the distance between the tie bar support plate and the movable die plate, and the length of tie bar during the various operating steps of the injection compression molding apparatus of the invention. An explanation of the concept of this embodiment of the invention will be given.

FIG. 23(a) shows the distance between the respective die plates during mold clamping under low pressure, the effective tie bar length being designated by l. The distance l' between the die plates 1 and 2 corresponds to the dimension of mold in the direction of movement of the movable die plate. The distance l" between the movable die plate 2 and the tie bar support plate 3 varies during movement of die plate 2 by the cylinder ram. Between the die plate 2 and the support plate 3 is provided a mechanism capable of precisely setting the distance l'. During injection of resin, the mold is slightly opened at the parting line or between the mold parts so that the dimension l' increases to l'+δ, and the cylinder ram, during the injection, is moved backwardly and stops at the rearward position as shown in FIG. 23(c). By limiting the amount of change of l" to l"−δ, setting the compression stroke δ is possible.

This embodiment also provides means to maintain the distances l"−δ and l even when plate 2 subjected to the injection pressure during the injection. In addition, during injection, the injection pressure will slightly further increase the volume of the cavity, whereby l increases slightly, or l"−δ is slightly reduced, but this change is neglected herein.

The compression cylinder for carrying out the high pressure compression process after completion of the injection is provided on the tie bar support plate 3 which is made movable, and the end of the tie bar forms the cylinder piston or ram. High pressure oil is fed into the end of the compression cylinder which is toward the stationary die plate to move the cylinder ram backwardly, moving the cylinder 114, tie bar plate 3 and associated structure forward so that distance l is reduced to l−δ and the space between die plates is reduced from l'+δ to l'.

In embodiment of the injection compression molding apparatus there is provided between the movable die plate 2 and the tie bar support plate 3 a mechanism which sets the distance between the movable die plate 2 and the tie bar support plate 3 at l"−δ even when movable die plate 2 is subjected to the injection pressure during the injection and filling, so that the compression operation carried out after injection can be carried out by use of the compression hydraulic cylinder provided on the tie bar support plate 3 and using the tie bar itself as the cylinder ram. The mold can be opened for ejection of product by the low force cylinder and then closed for the subsequent working cycle, and the compression stroke can be set in units of microns.

This embodiment of the injection compression molding apparatus of the invention will be described in connection with FIGS. 24 and 25. The mold is positioned between a stationary die plate 1 fixed to the bed of the molding apparatus and a movable die plate 2, a mounting plate 104 and a mold plate 105 on the stationary die plate and a mold plate 106 on the movable die plate defining a mold cavity 107, the mold plate 106 having a complex construction because an ejector mechanism (not shown) is incorporated therein. Nozzle 115 is provided to inject resin into the mold cavity. A mold opening and closing cylinder 109 having a mold opening and closing cylinder ram or piston 108 is mounted on the tie bar support plate and a compression stroke setting mechanism is provided between the tie bar support plate 3 and the movable die plate 2.

Figure 24:
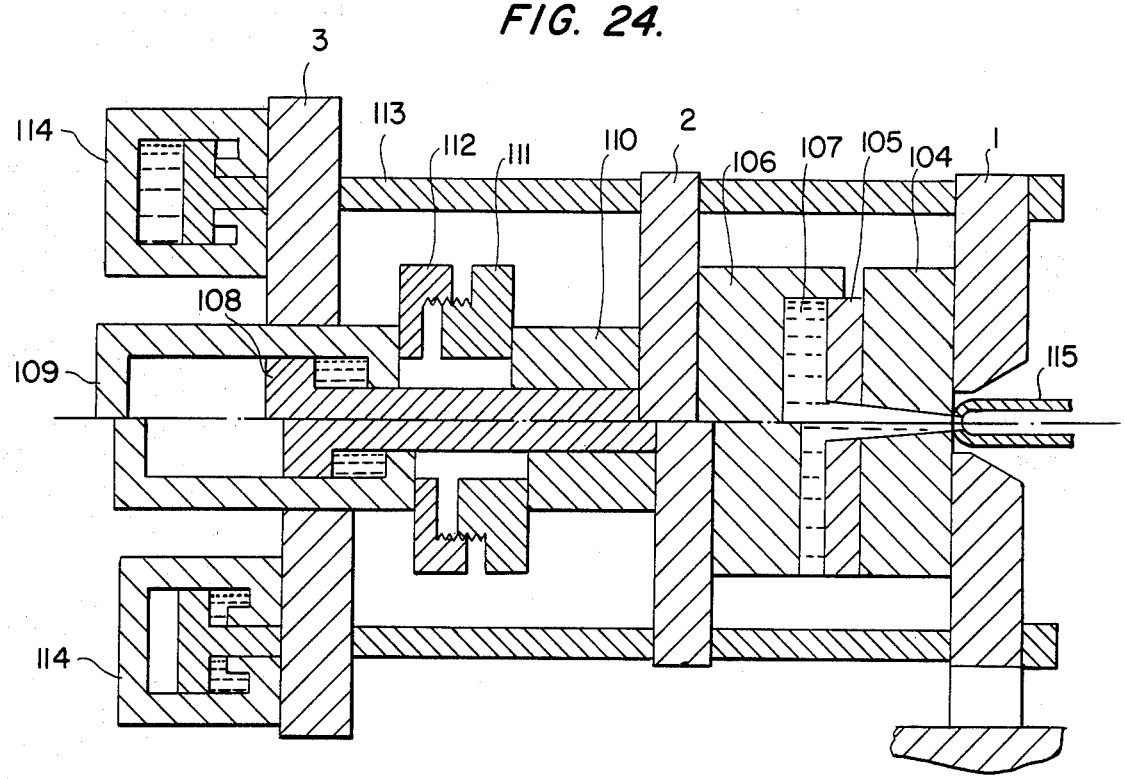
FIG. 24 is a view similar to FIG. 5 showing a still further embodiment of the compression stroke setting mechanism of the invention.

In FIG. 24, a key 110 is removably positioned between the movable die plate 2 and an adjustment mechanism comprising adjusting members 111 and 112 mounted on the tie bar support plate 3 through the cylinder 109. In the upper half of FIG. 24, the cylinder ram 8 is retracted to the position for permitting injection, as shown in FIG. 23(b). In the lower half of FIG. 24 the compression hydraulic cylinder 114 has been supplied with high pressure oil in the front portion of the cylinder and the cylinder and tie bar mounting plate 3 move toward the stationary die plate 1 along the tie bar 113 acting as a stationary ram or piston to reduce the effective length of the tie bar and also shorten the space between the die plates, whereby the cavity volume is reduced to the predetermined size of the product.

Figure 25:
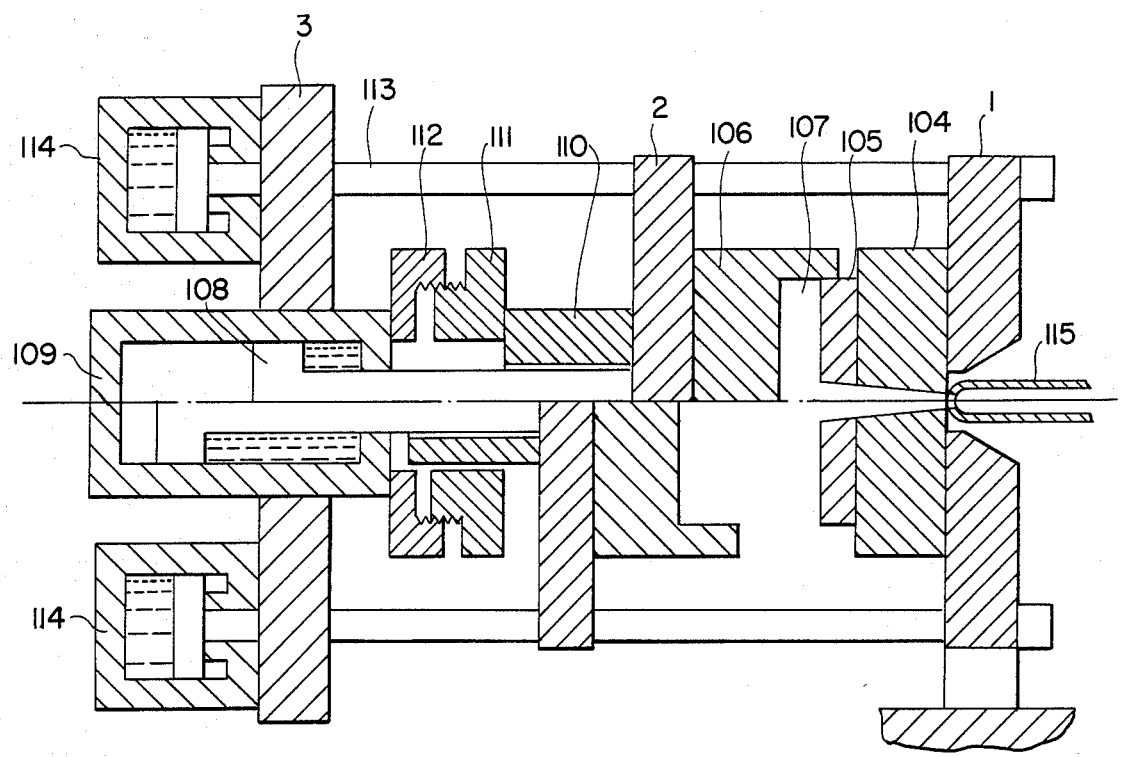
FIG. 25 is a view similar to FIG. 24 showing in the upper part the positions of the components during the injection and in the lower part the positions of the components during the opening of mold for ejection.

The compression pressure falls as the resin cools, and upon completing the compression operation, the hydraulic oil is fed into the rear portion of cylinder 114 to move the cylinder and the tie bar support plate away from the stationary die plate 1 to increase the effective length of tie bar, the key 110 is removed as shown in the lower half of FIG. 25, and then the mold opening and closing cylinder ram 108 is moved backward to open the mold for ejection of the product. Upon completion of the ejection of the product, the cylinder ram 108 is moved forward, the key 110 is inserted, and the cylinder ram 108 is moved backward again to set the compression stroke, as shown in the upper part of FIG. 25, thereby putting the mold in condition having resin injected.

The adjusting members 111 and 112 and key 110, which are disposed around the cylinder ram 108 as shown in FIGS. 24 and 25, can alternatively be disposed around the tie bar 113, or in the space between the tie bar 113 and cylinder ram 108. Also, the adjusting members 111 and 112 may be mounted on the movable die plate 2.

The structures shown in FIGS. 13 through 18 can all be used. The key 30 and compression stroke setting rods 31 and 32 in FIG. 13 correspond to the key 110 and adjusting members 111 and 112 respectively. Also, the key 30 and setting rod 32 in the parts of FIG. 14 and in FIG. 15 correspond to the key 110 and adjusting member 112 in FIGS. 24 and 25. Furthermore, the adjusting mechanisms in FIGS. 16, 17, 18 and 22 can all be used.

As seen from the above, the injection compression molding apparatus of the invention provides a mechanism for setting the distance between the tie bar support plate or base and the movable die plate to thereby set the compression stroke, so that the thickness of the cavity in the mold can be increased to enlarge the volume of the cavity, and after completion of injection of resin into the cavity, the mold clamping force can be applied for compression, and thereafter the mold can be opened for discharge of the product, whereby the resin is not deformed at all during the resin-setting process and the products are free from strain.

Alternatively, the molding apparatus of the invention may be used to completely close the mold and resin may be injected thereinto and thereafter the mold may be slightly opened to allow the resin to foam, thereby enabling so-called foaming.

In this sense, the injection compression molding apparatus can be said to be an injection foaming molding apparatus.

In addition, the molding apparatus of the invention can have resin containing a foaming agent injected thereinto while it is in the state shown in the lower half of FIG. 5 and then the mold is opened as shown in the upper half of FIG. 4 to allow the resin to foam, thus making possible injection foaming molding.

What is claimed is:

1. An injection compression molding apparatus comprising:
    a mold unit having a stationary die plate, a mounting plate fixed to said stationary die plate and a mold plate on said mounting plate, a movable die plate movable toward and away from said stationary die plate and having a movable mold plate thereon and defining a mold cavity with said mold plate on said stationary die plate;
    an injection nozzle directed into said mold cavity for injecting a resin to be molded into said cavity;
    a fixed supporting plate;
    main drive means having a main cylinder supported on said supporting plate and a main cylinder ram having the outer end connected to said movable die plate for moving said movable die plate between a position in which said mold plates are fully closed and a position in which said mold plates are open to permit discharge of a molded product; and
    compression stroke setting means for blocking movement of said movable die plate in the direction toward said stationary die plate at a position spaced a distance away from the fully closed position corresponding to a desired compression stroke of said mold plate, and comprising adjustment means positioned between said stationary die plate and said movable die plate, at least part of said adjustment means which has a dimension in the direction of movement of said movable die plate greater than said compression stroke being movable laterally of the said direction of movement of said movable die plate for permitting said movable die plate to move to the fully closed position, and drive means connected to said adjusting means for moving at least said part of said adjusting means in the lateral direction.

2. An apparatus as claimed in claim 1 in which said adjustment means comprises at least one fixed part fixed to one of said die plates and a movable part movable laterally of said fixed part from a position aligned between said fixed part and the other die to a position out of alignment with said fixed part.

3. An apparatus as claimed in claim 2 in which at least one of said parts has a length in the direction of movement of said movable die plate which is adjustable.

4. An apparatus as claimed in claim 3 in which said fixed part has the length thereof adjustable.

5. An apparatus as claimed in claim 3 in which said laterally movable part has the length thereof adjustable.

6. An apparatus as claimed in claim 1 in which said fixed part comprises a pair of setting rods fixed at one end to said stationary die plate and said movable die plate respectively and having the free ends in spaced opposed relationship to each other, and said movable part comprises a movable rod contactable at both ends with said free ends of said pair of setting rods when said movable rod is in said aligned position.

7. An apparatus as claimed in claim 6 in which said movable rod has two parts in threaded engagement with each other for making the length thereof adjustable.

8. An apparatus as claimed in claim 6 in which at least one of said pair of setting rods has two parts in threaded engagement for making the length thereof adjustable.

9. An apparatus as claimed in claim 2 in which said fixed part is a cylindrical member fixed at its center opening to said ram of said main cylinder and having a protrusion on its outer surface, and said movable member comprises a ring member concentric with said cylindrical member, the diameter of the inner surface of said ring member being sufficiently large to allow said cylindrical member to fit thereinto, and said inner surface having a protrusion thereon contactable with said protrusion on said cylindrical member when said movable member is turned around said cylindrical member to a specific position.

10. An apparatus as claimed in claim 1 in which said drive means for said compression stroke setting means comprises a cylinder and a cylinder ram connected at the free end to said laterally movable part.

11. An injection compression molding apparatus comprising:
    a mold unit having a stationary die plate, a mounting plate fixed to said stationary die plate and a mold plate on said mounting plate, a movable die plate movable toward and away from said stationary die plate and having a movable mold plate thereon and defining a mold cavity with said mold plate on said stationary die plate;
    an injection nozzle directed into said mold cavity for injecting a resin to be molded into said cavity;
    a fixed supporting plate;
    main drive means having a main cylinder supported on said supporting plate and a main cylinder ram having the outer end connected to said movable die plate for moving said movable die plate between a position in which said mold plates are fully closed and a position in which said mold plates are open to permit discharge of a molded product; and
    compression stroke setting means for blocking movement of said movable die plate in the direction toward said supporting plate at a position spaced a distance away from the fully closed position corresponding to a desired compression stroke of said mold plate, and comprising adjustment means positioned between said movable die plate and said supporting plate, at least part of said adjustment means which has a dimension in the direction of movement of said movable die plate greater than the stroke for moving said movable die plate to the position in which said mold plates are open being movable laterally of the said direction of movement of said movable die plate for permitting said movable die plate to move to the open mold position, and drive means connected to said adjusting means for moving at least said part of said adjusting means in the lateral direction.

12. An apparatus as claimed in claim 11 in which said adjustment means comprises at least one fixed part fixed to one of said movable die plate and said supporting plate, and a movable part movable laterally of said fixed part from a position aligned between said fixed part and the other plate to a position out of alignment with said fixed part.

13. An apparatus as claimed in claim 12 in which at least one of said parts has a length in the direction of movement of said movable die plate which is adjustable.

14. An apparatus as claimed in claim 13 in which said fixed part has the length thereof adjustable.

15. An apparatus as claimed in claim 12 in which said fixed part comprises a pair of setting rod means fixed at one end to said supporting plate and said movable die plate respectively and having the free ends in spaced opposed relationship to each other, and said movable part comprises a movable member contactable at both ends with said free ends of said pair of setting rod means when said movable member is in said aligned position.

16. An apparatus as claimed in claim 15 in which at least one of said pair of setting rod means has two parts in threaded engagement for making the length thereof adjustable.

17. An apparatus as claimed in claim 12 in which said fixed part is a cylindrical member fixed at its center opening to said ram of said main cylinder and having a protrusion on its outer surface, and said movable member comprises a ring member concentric with said cylindrical member, the diameter of the inner surface of said ring member being sufficiently large to allow said cylindrical member to fit thereinto, and said inner surface having a protrusion thereon contactable with said protrusion on said cylindrical member when said movable member is turned around said cylindrical member to a specific position.

18. An apparatus as claimed in claim 11 in which said drive means for said compression stroke setting means comprises a cylinder and a cylinder ram connected at the free end to said laterally movable part.

19. An injection compression molding apparatus comprising:
  a mold unit having a stationary die plate, a mounting plate fixed to said stationary die plate and a mold plate on said mounting plate, a movable die plate movable toward and away from said stationary die plate and having a movable mold plate thereon and defining a mold cavity with said mold plate on said stationary die plate;
  an injection nozzle directed into said mold cavity for injecting a resin to be molded into said cavity;
  a movable supporting plate;
  movable die plate drive means having a main cylinder supported on said supporting plate and a main cylinder ram having the outer end connected to said movable die plate for moving said movable die plate between an injection position in which said movable die plate is spaced from the fully closed position by a distance corresponding to a desired compression stroke of said mold plate and a position in which said mold plates are open to permit discharge of a molded product; and
  compression drive means operably connected to said supporting plate for moving said supporting plate, said movable die plate drive means thereon and said movable die plate between said injection position of said movable die plate and said fully closed position; and
  compression stroke setting means for blocking movement of said movable die plate in the direction toward said supporting plate at said injection position, and comprising adjustment means positioned between said movable die plate and said supporting plate, at least part of said adjustment means which has a dimension in the direction of movement of said movable die plate greater than the stroke for moving said movable die plate to the position in which said mold plates are open being movable laterally of the said direction of movement of said movable die plate for permitting said movable die plate to move to the open position, and drive means connected to said adjusting means for moving at least said part of said adjusting means in the lateral direction.

20. An apparatus as claimed in claim 19 in which said compression drive means comprises a hydraulic cylinder means mounted on said stationary die plate and having the free end of the ram thereof connected to said supporting plate.

21. An apparatus as claimed in claim 19 in which said compression drive means comprises a hydraulic cylinder means mounted on said supporting plate and having the free end of the ram thereof connected to said stationary die plate.

22. An apparatus as claimed in claim 19 in which said adjustment means comprises at least one fixed part fixed to one of said movable die plate and said supporting plate, and a movable part movable laterally of said fixed part from a position aligned between said fixed part and the other plate to a position out of alignment with said fixed part.

23. An apparatus as claimed in claim 22 in which at least one of said parts has a length in the direction of movement of said movable die plate which is adjustable.

24. An apparatus as claimed in claim 23 in which said fixed part has the length thereof adjustable.

25. An apparatus as claimed in claim 13 in which said laterally movable part has the length thereof adjustable.

26. An apparatus as claimed in claim 22 in which said fixed part comprises a pair of setting rod means fixed at one end to said supporting plate and said movable die plate respectively and having the free ends in spaced opposed relationship to each other, and said movable part comprises a movable member contactable at both ends with said free ends of said pair of setting rod means when said movable member is in said aligned position.

27. An apparatus as claimed in claim 26 in which said movable rod has two parts in threaded engagement with each other for making the length thereof adjustable.

28. An apparatus as claimed in claim 26 in which at least one of said pair of setting rods has two parts in threaded engagement for making the length thereof adjustable.

29. An apparatus as claimed in claim 22 in which said fixed part is a cylindrical member fixed at its center opening to said ram of said main cylinder and having a protrusion on its outer surface, and said movable member comprises a ring member concentric with said cylindrical member, the diameter of the inner surface of said ring member being sufficiently large to allow said cylindrical member to fit thereinto, and said inner surface having a protrusion thereon contactable with said protrusion on said cylindrical member when said movable member is turned around said cylindrical member to a specific position.

30. An apparatus as claimed in claim 19 in which said drive means for said compression stroke setting means comprises a cylinder and a cylinder ram connected at the free end to said laterally movable part.

* * * * *